United States Patent
Beas Bujanos

(10) Patent No.: US 10,516,481 B2
(45) Date of Patent: Dec. 24, 2019

(54) UPSTREAM FAILURE RECOVERY IN AN RFOG FFTP NETWORK

(71) Applicant: ARRIS Enterprises LLC, Suwanee, GA (US)

(72) Inventor: Joaquin Beas Bujanos, Escobedo (MX)

(73) Assignee: ARRIS Enterprises LLC, Suwanee, GA (US)

( * ) Notice: Subject to any disclaimer, the term of this patent is extended or adjusted under 35 U.S.C. 154(b) by 183 days.

(21) Appl. No.: 15/387,856

(22) Filed: Dec. 22, 2016

(65) Prior Publication Data

US 2018/0183523 A1 Jun. 28, 2018

(51) Int. Cl.
| | |
|---|---|
| *H04B 10/00* | (2013.01) |
| *H04B 10/2575* | (2013.01) |
| *H04J 14/02* | (2006.01) |
| *H04J 14/00* | (2006.01) |

(52) U.S. Cl.
CPC .... *H04B 10/25751* (2013.01); *H04J 14/0293* (2013.01)

(58) Field of Classification Search
CPC .......... H04B 10/2575; H04B 10/25751; H04B 10/25752; H04B 10/25753; H04B 10/25754; H04B 10/25758; H04B 10/03; H04B 10/032; H04B 10/038
See application file for complete search history.

(56) References Cited

U.S. PATENT DOCUMENTS

| | | | |
|---|---|---|---|
| 6,567,579 B2 | 5/2003 | Foltzer | |
| 6,718,084 B1 | 4/2004 | Wang | |
| 6,821,026 B2 | 11/2004 | Devine et al. | |
| 6,955,483 B2 | 10/2005 | Narayan | |
| 7,570,679 B2 | 8/2009 | Gibson et al. | |
| 8,202,755 B2 | 6/2012 | Fattal et al. | |
| 2002/0118425 A1 | 8/2002 | Dove et al. | |
| 2003/0011849 A1* | 1/2003 | Farmer | H04B 10/25751 398/166 |
| 2003/0202794 A1* | 10/2003 | Izadpanah | H01Q 3/2676 398/115 |
| 2006/0133742 A1* | 6/2006 | Ruegg | G02B 6/4246 385/89 |
| 2010/0221019 A1 | 9/2010 | Wolodkowicz et al. | |
| 2015/0050015 A1 | 2/2015 | Levy et al. | |
| 2017/0257166 A1* | 9/2017 | Maricevic | H04B 10/25751 |

OTHER PUBLICATIONS

Al-Banna, A., et al., "The Spectral Efficiency of DOCSIS 3.1 Systems", ARRIS Enterprises, Inc., 2014.
Papadimitriou, G., et al., "Optical Switching: Switch Fabrics, Techniques, and Architectures", Journal of Lightwave Technology, vol. 21, No. 2, Feb. 2003.
AgileMax, "Complete OBI Elimination HPON Optical Distribution Solution", DOCSIS 3.1, HPON/FFoG-AgileMax, Dec. 2015, 2 pgs.

* cited by examiner

*Primary Examiner* — Daniel G Dobson
(74) *Attorney, Agent, or Firm* — Lori Anne D. Swanson

(57) ABSTRACT

Devices and methods for bypassing a defective component in a combining network relaying respective upstream and downstream signals between a head end and a plurality of subscribers. The devices and methods may preferably redirect the upstream signal without redirecting the downstream signal using a wavelength-dependent filter.

12 Claims, 15 Drawing Sheets

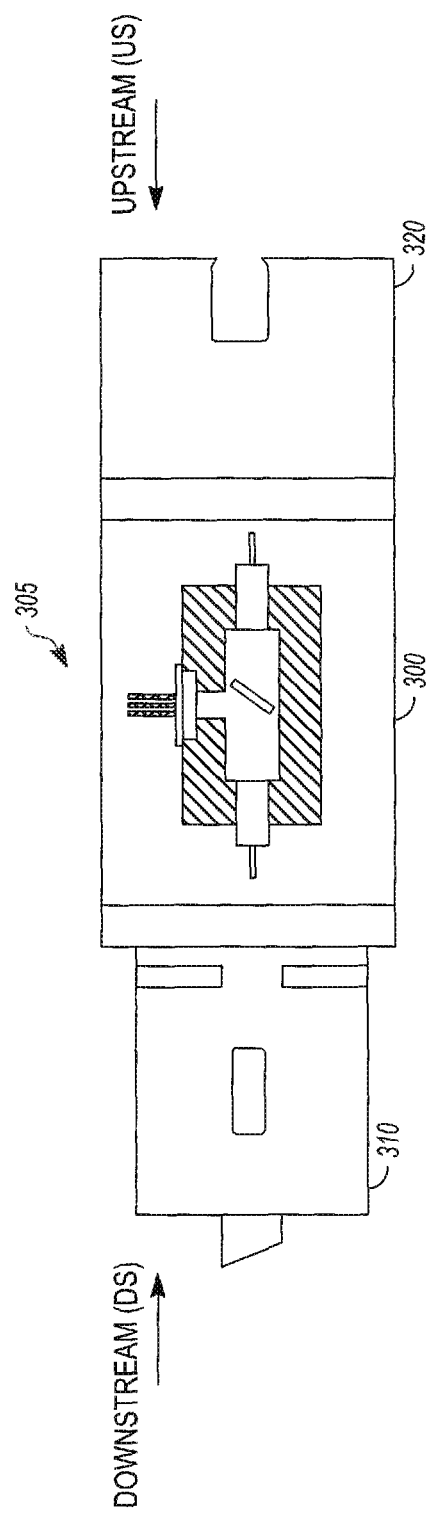

4) LC/PC RECEPTACLE (LEFT) AND LC/PC CONNECTOR (RIGHT)
5) LC/PC CONNECTOR (LEFT) AND LC/PC RECEPTACLE (RIGHT)
6) LC/PC CONNECTOR (LEFT) AND LC/PC CONNECTOR (RIGHT)
7) LC/PC RECEPTACLE (LEFT) AND LC/PC RECEPTACLE (RIGHT)

1) SC/APC RECEPTACLE (LEFT) AND SC/APC CONNECTOR (RIGHT)
2) SC/APC CONNECTOR (LEFT) AND SC/APC CONNECTOR (LEFT)
3) SC/APC RECEPTACLE (LEFT) AND SC/APC RECEPTACLE (RIGHT)

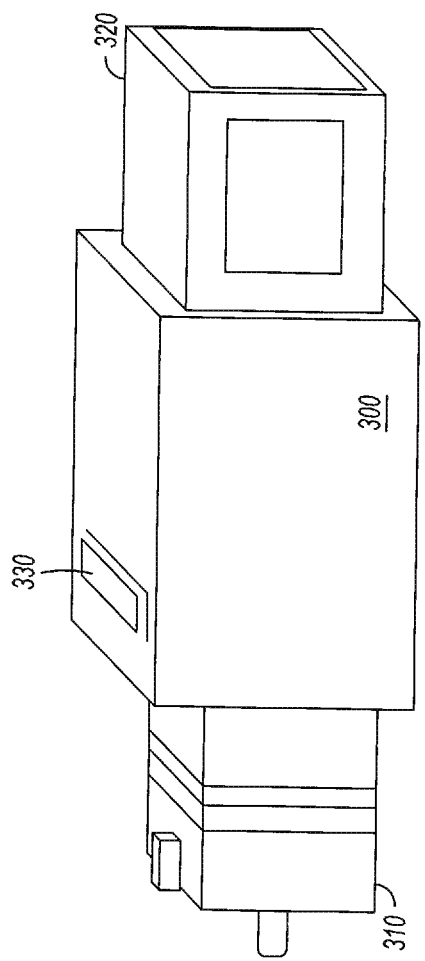

UPSTREAM FAILURE RECOVERY IN AN RFOG FFTP NETWORK

CROSS-REFERENCE TO RELATED APPLICATIONS

None.

BACKGROUND

The present disclosure relates to systems and methods that process signals over a cable transmission network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, not only provide for a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path" "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial twisted pair conductor can carry six simultaneous phone calls, while a single fiber pair can carry more than 2.5 million phone calls simultaneously. Furthermore, coaxial cable, depending on the type/size/conductor, may have tens of dBs of losses per hundreds of feet (and the higher the RF frequency desired, the higher the coaxial cable losses). In HFC networks these losses require placement of in-line RF amplifiers. Conversely, optical FTTP has fewer losses and no need for in-line amplifiers. FTTP also allows consumers to bundle their communications services to receive telephone, video, audio, television, any other digital data products or services simultaneously.

In the upstream path, respective optical signals from groups of customer are combined together by one or more combining networks. These combining networks typically include a number of photodiodes that receive upstream optical signals and convert them to electrical signals where they may be combined, amplified, multiplexed, and converted back to an optical signal for further upstream transmission to the next point in the network. Oftentimes one or more photodiodes in such combining networks, or the laser that retransmits the signals in the upstream direction, will fail, requiring repair, during which the combining network is non-operational and service is interrupted. What is desired, therefore, is an improved system that ameliorates this service interruption.

BRIEF DESCRIPTION OF THE SEVERAL VIEWS OF THE DRAWINGS

FIG. 8A shows an exemplary mechanical design of the optical recovery module of FIGS. 4-7.

FIG. 9A shows an exemplary electrical interface mounted on the optical recovery module of FIG. 4.

DETAILED DESCRIPTION

As indicated earlier, modern CATV architectures transmit upstream optical signals using combining networks where the outputs of several optical photodiodes (PDs) are converted to electrical signals and combined, so that the combined upstream signal can be re-converted to an upstream optical signal output by a transmitter, such as a laser. Such architectures are particularly preferred by CATV providers who desire to not only reduce cost, but increase performance of Radio Fiber over Glass (RFoG)/Fiber-to-the-Home (FTTH) networks. For example, the new DOCSIS 3.1 standard specifies Optical Frequency Division Multiple Access (OFDMA) for upstream signals. In OFDMA, optical beat interference (OBI) is a critical impairment considering that the transmitters at Customer Premise Equipment (CPE) are typically not cooled, resulting in wavelength variation due to fluctuating temperatures. Therefore, point-to-point optical links from CPE to the RFoG/FTTH node will be preferred to satisfy link performance requirements.

U.S. patent application Ser. No. 15/057,292, filed on Mar. 1, 2016, the contents of which is hereby incorporated by reference in its entirety, describes a Hybrid Passive Optical Network (HPON) network technology where upstream signals from a group of subscribers are collected by independent photodiodes and electrically combined for Optical Beat Interference (OBI) elimination. Then, the combined upstream signals in the electrical domain are transmitted back to the headend using a single upstream transmitter.

Figure 1:
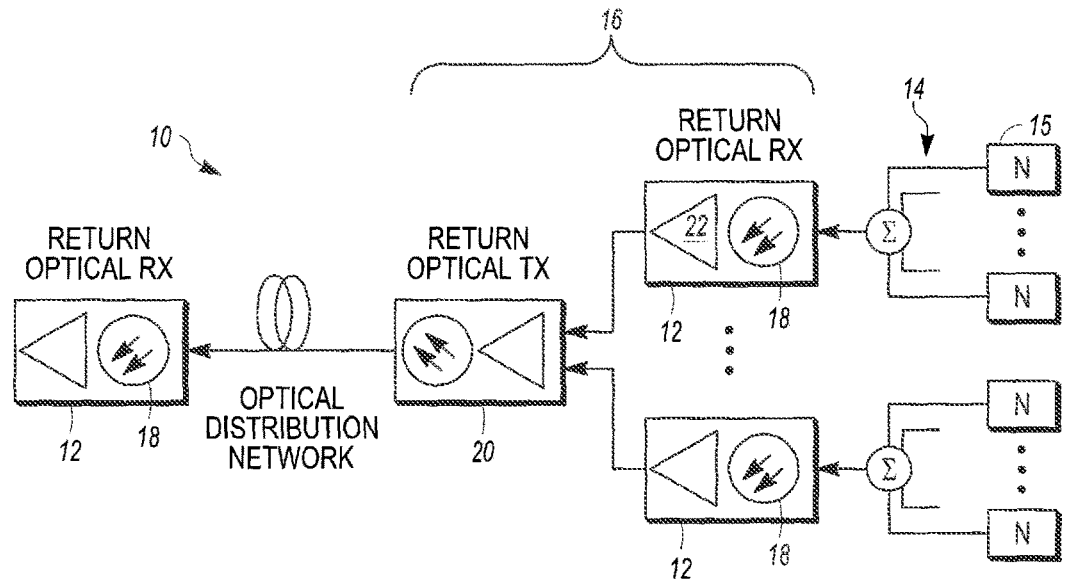
FIG. 1 shows an exemplary RFoG architecture transmitting a number of upstream optical signals through a combining network having a plurality of photodiodes, and to an optical distribution network.

Referring to FIG. 1, which generally illustrates such an HPON system 10, optical receivers 12 collect upstream signals 14 from a plurality of small groups of subscribers 15. These signals are aggregated by the combining network 16 having a plurality of photodiodes 18 that convert the received optical signals to electrical signals; the combined electrical signal is amplified and provided as an input to an upstream transmitter 20, which outputs the received signals to an optical distribution network using a wavelength division multiplexer (not shown). The combining network 15 may be in, for example, a node between the head end and the subscribers 15. Combining the outputs of many optical photodiodes reduces the number of upstream optical transmitters as presented in FIG. 1. The resulting cost reduction is attractive if the bandwidth per photodiode is within design guidelines, and if the aggregating of the photodiode outputs is performed in an inexpensive manner that does not impact the signal-to-noise ratio (SNR).

Figure 2:
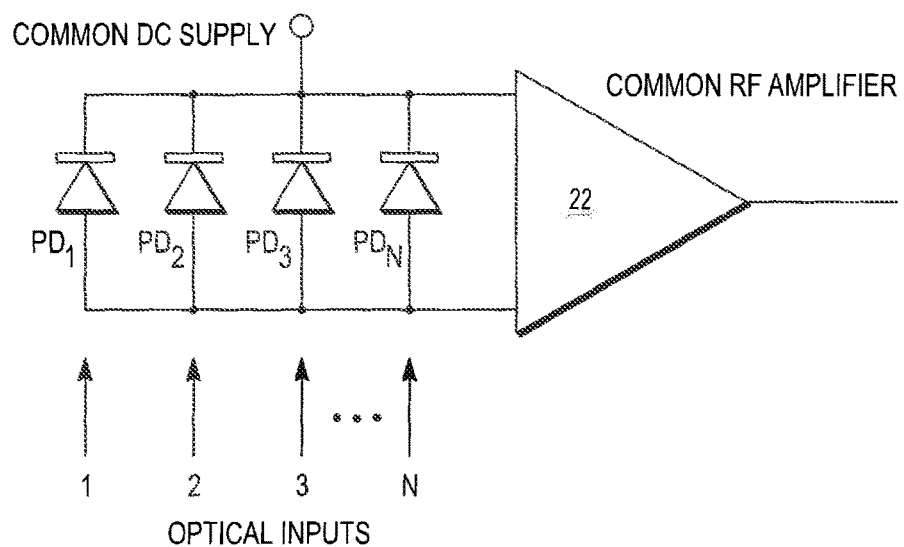
FIG. 2 shows an exemplary system where the photodiodes of FIG. 1 are cascaded in parallel.

Referring to FIG. 2, an arbitrary number of photodiodes can be cascaded in parallel, followed by a single electrical amplifier 22. Since reverse-biased photodiodes present relatively high impedance, there is no need for impedance-matching networks, and photodiodes can be scaled up easily. The limit on the number of photodiodes that can be cascaded in parallel is determined by the accumulation of parasitic capacitance. Low parasitic capacitance photodiodes can be employed to obtain the maximum number of parallel cascades possible.

Figure 3A:
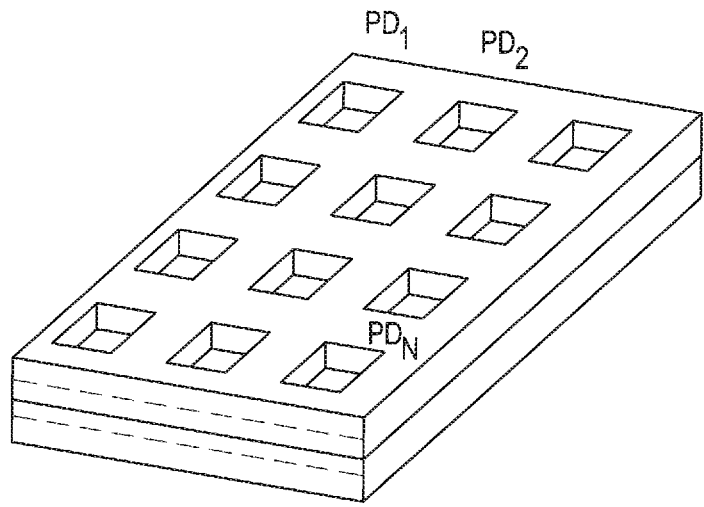
FIG. 3A shows the photodiodes of FIG. 2 integrated onto a substrate.
Figure 3B:
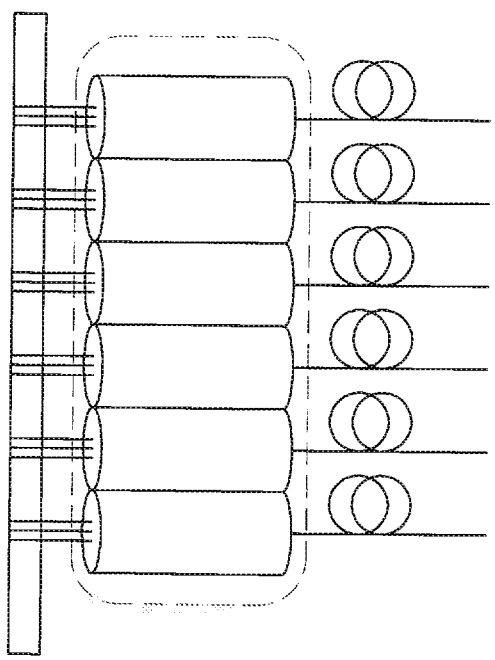
FIG. 3B schematically shows the photodiodes of FIG. 2 stacked together into an assembly.
Figure 3C:
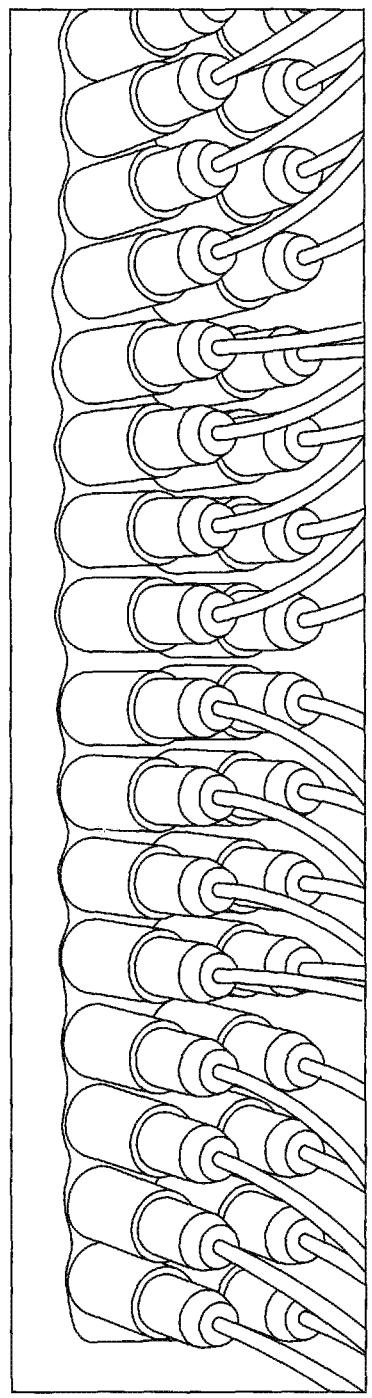
FIG. 3C shows a photograph of photodiodes in a stacked configuration.

Typically, as shown in FIG. 3A, the implementation of optical modules with multiple photodiodes is performed by integrating photodiode modules, each of which is configured to selectively absorb light at a selected wavelength or range of wavelengths, or by stacking multiple independent photodiode submodules as seen in FIG. 3B, which may or not include internal optical filters for wavelength selection. FIG. 3C shows a photograph of stacked photodiode submodules. In either implementations, the multiple photodiodes are integrated in a single enclosed optical assembly, which is manufactured with the objective to support multiple optical inputs.

The implementation of multiple photodiodes into a single enclosed assembly has the advantage of integration and manufacturability cost. Furthermore, transmission of multiple upstream signals using a single upstream transmitter also present advantages in terms of cost effectiveness. However, both implementations present several important drawbacks. One drawback is network reliability. The quality of the network to transport traffic can be generally considered as the probability that there exists one functional path between a given pair of entities. Availability is the level of operational performance that is met during a measured period of time, and is usually expressed as the percentage of time that the system is operational. The disadvantage of a single enclosed assembly supporting multiple photodiodes mainly impacts the Failure in Time (FIT) and Mean Time to Repair (MTTR) metrics. An upstream photodiode failure in a single assembly represents a complicated repair task leading to a high MTTR which dramatically increases the repair cost and reduces network availability. Furthermore, FIT is calculated by adding the FITs from each PD (and any other optical component) on the assembly, hence when one photodiode or transmitter in the enclosed assembly fails, repairing that failure necessitates interruption of service of upstream transmission of all photodiodes in the assembly. Similarly, a single upstream transmitter supporting multiple users also becomes a critical item in terms of network availability.

FIGS. 4-7 illustrate several exemplary embodiments of respective novel recovery modules that ameliorate the drawbacks just described with respect to FIT and MTTR when a failure occurs in a photodiode inside of a single enclosed optical assembly containing multiple photodiodes, or in an upstream transmitter, i.e. laser in a node. As further described below with respect to FIGS. 4-7 individually, preferably these embodiments comprise a low-cost, easy-to-install optical recovery module designed to support the upstream link recovery in an RFoG/FTTH node. For example, when a failure occurs in a specific upstream photodiode on the RFoG/FTTH node, the recovery module may in one embodiment be preferably connected in-line to operate as optical receiver for upstream transmissions and as an optical pass-through for downstream transmissions. Similarly, if a failure occurs in an upstream transmitter, the optical recovery module may be preferably designed to operate as optical transmitter for upstream signals and as an optical pass-through for downstream signals. Preferably, the RFoG/FTTH node is adapted to host the proposed optical recovery modules to support recovery of failed photodiodes or failed upstream transmitters.

Figure 4:
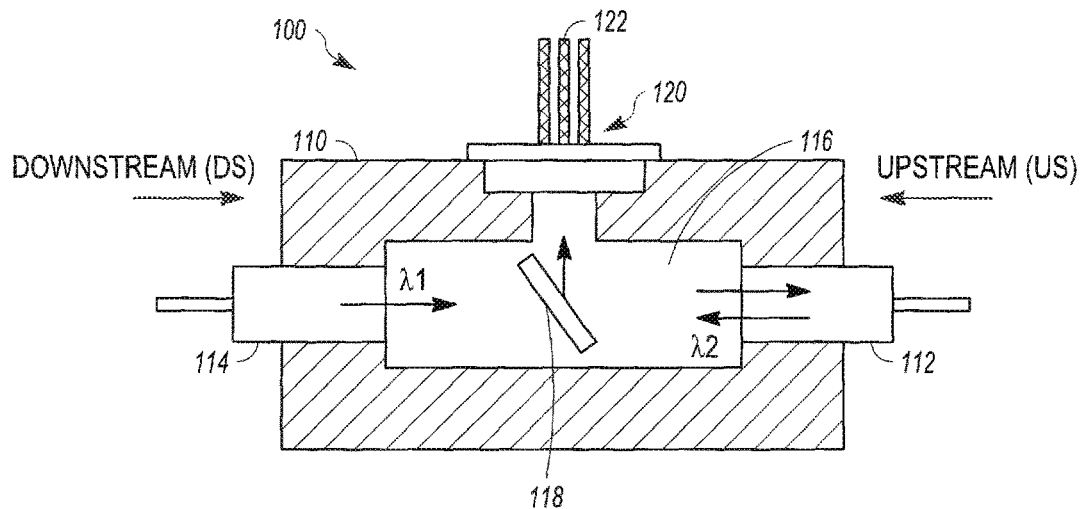
FIG. 4 shows an exemplary optical recovery module for a unit having a plurality of photodiodes together inputting respective signals into an upstream combining network using a transmitter.
Figure 13:
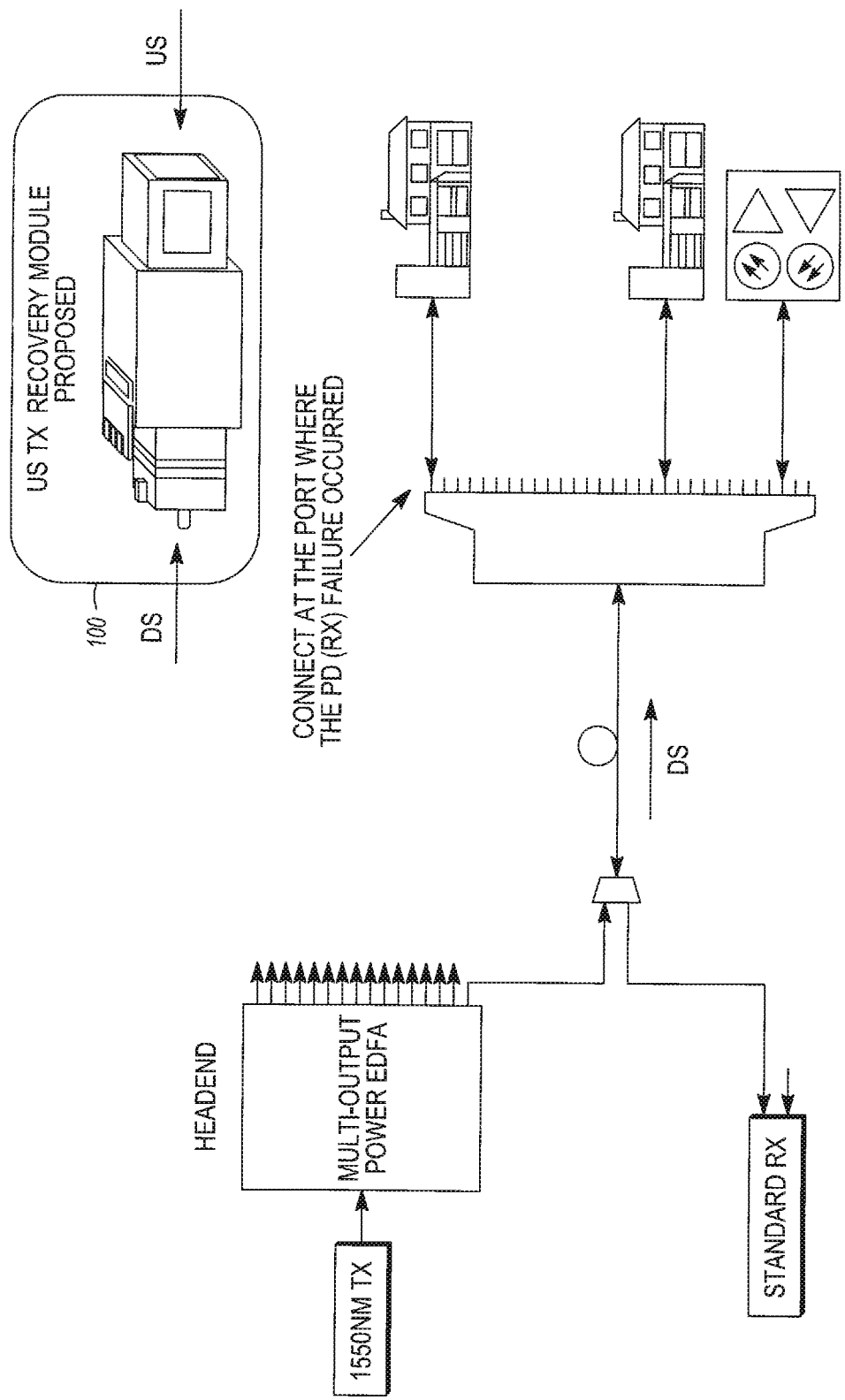
FIG. 13 shows a multiport HPON node including the optical recovery module of FIG. 4.

Referring specifically to FIG. 4, one exemplary recovery module 100 may include a housing supporting a first connection 112 selectively connectable to a fiber-optic link that would typically connect to the input terminal of the photodiode that has failed. The housing also supports a second connection 114 selectively connectable to the input terminal of the photodiode that has failed. Stated simply, and as graphically illustrated in FIG. 13, the recovery module 100 may simply be an adapter that at one end plugs into the input associated with the failed diode, where the cable link that was connected to that photodiode input connects to the other end of the recovery module 100.

The recovery module 100 also defines an optical path 116 from the first connection 112 to the second connection 114, and through a wavelength selective filter 118 tuned to pass through signals in the spectrum reserved for downstream transmissions (typically 1550 nm), but to divert signals in the spectrum reserved for upstream transmissions (typically 1610 nm) to a photodiode 120. The photodiode 120 converts the upstream optical signal to an electrical signal propagated through an electrical cable 122 selectively connectable to the main Printed Circuit Board Assembly (PCBA) of the node, which hosts the RF signal conditioning circuits of the radio-frequency (RF) upstream signals received inside the node. Thus, as can easily be seen, once plugged into the port of a failed photodiode and the PCBA of the node, the downstream signal will simply pass through the node unimpeded while the upstream signal will be redirected to a working photodiode, which converts the optical signal to an electrical signal and passes it through the node to the upstream laser just as if it were received from the failed photodiode.

Figure 5:
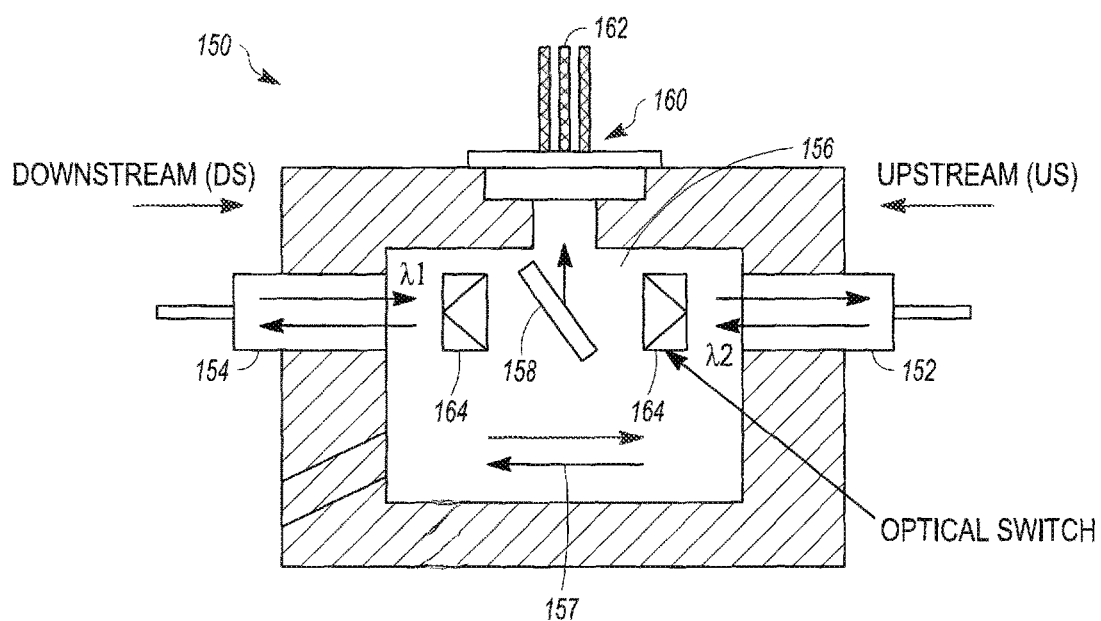
FIG. 5 shows an alternate exemplary optical recovery module for a unit having a plurality of photodiodes together inputting respective signals into an upstream combining network.

The recovery module 100 of FIG. 4 is preferably connected at the failed port only after a failure occurs. In contrast, FIG. 5 shows an alternate recovery module 150 intended to be integrated into a node for redundancy functionality. Preferably, the recovery module 150 is connected to the node even when all photodiodes inside the node are operating correctly. The recovery module 150 preferably includes a housing supporting a first connection 152 selectively connectable to a fiber-optic link transmitting upstream signals into the node, and a second connection 154 selectively connectable to the input terminal of a photodiode. The recovery module 150 also defines a first optical path 156 from the first connection 152 to the second connection 154, and through a wavelength selective filter 158 tuned to pass through signals in the spectrum reserved for downstream transmissions (typically 1550 nm), but to divert signals in the spectrum reserved for upstream transmissions (typically 1610 nm) to a photodiode 160. The photodiode 160 converts the upstream optical signal to an electrical signal propagated through an electrical cable 122 connected to the main Printed Circuit Board Assembly (PCBA) of the node, which hosts the RF signal conditioning circuits of the radio-frequency (RF) upstream signals received inside the node.

The recovery module 150 also includes a second optical path 157 from the first connection 152 to the photodiode (not shown) associated with the input port to which the recovery module 150 is inserted. The recovery module 150 includes switches 164 that may be selectively activated when the node's photodiode fails. Thus, during normal operation when the node's photodiode is operational, the switches 164 direct the upstream and downstream signals through the second path 157. Should the node's photodiode fail, however, the switches may redirect the upstream and downstream signals through the first path 156, in which case the recovery module 150 behaves exactly as does the recovery module 100. In some embodiments, the switches 164 may be activated remotely, while in other embodiments, the switches 164 may be activated on-site.

Figure 6:
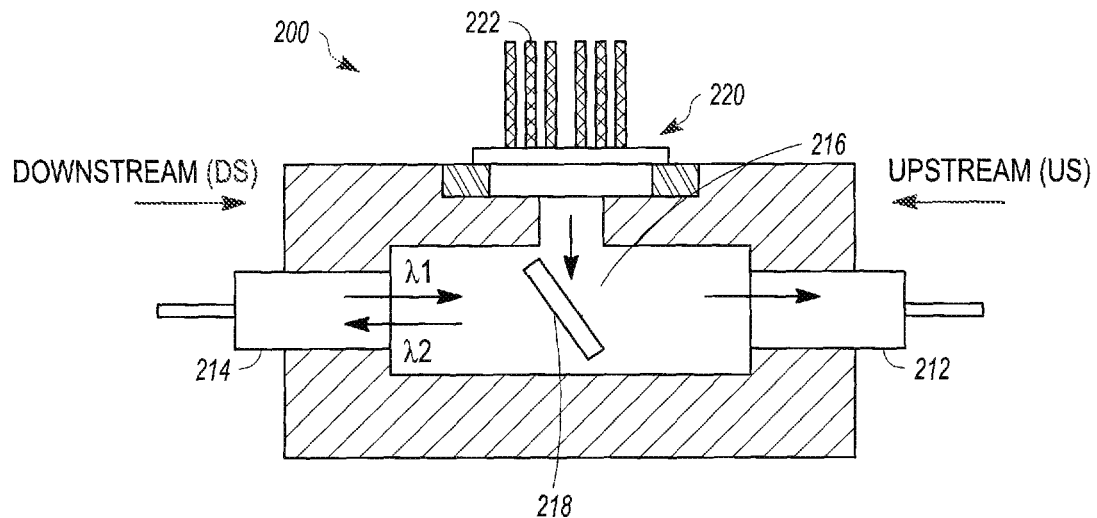
FIG. 6 shows an exemplary optical recovery module for a transmitter that transmits an upstream optical signal.
Figure 14:
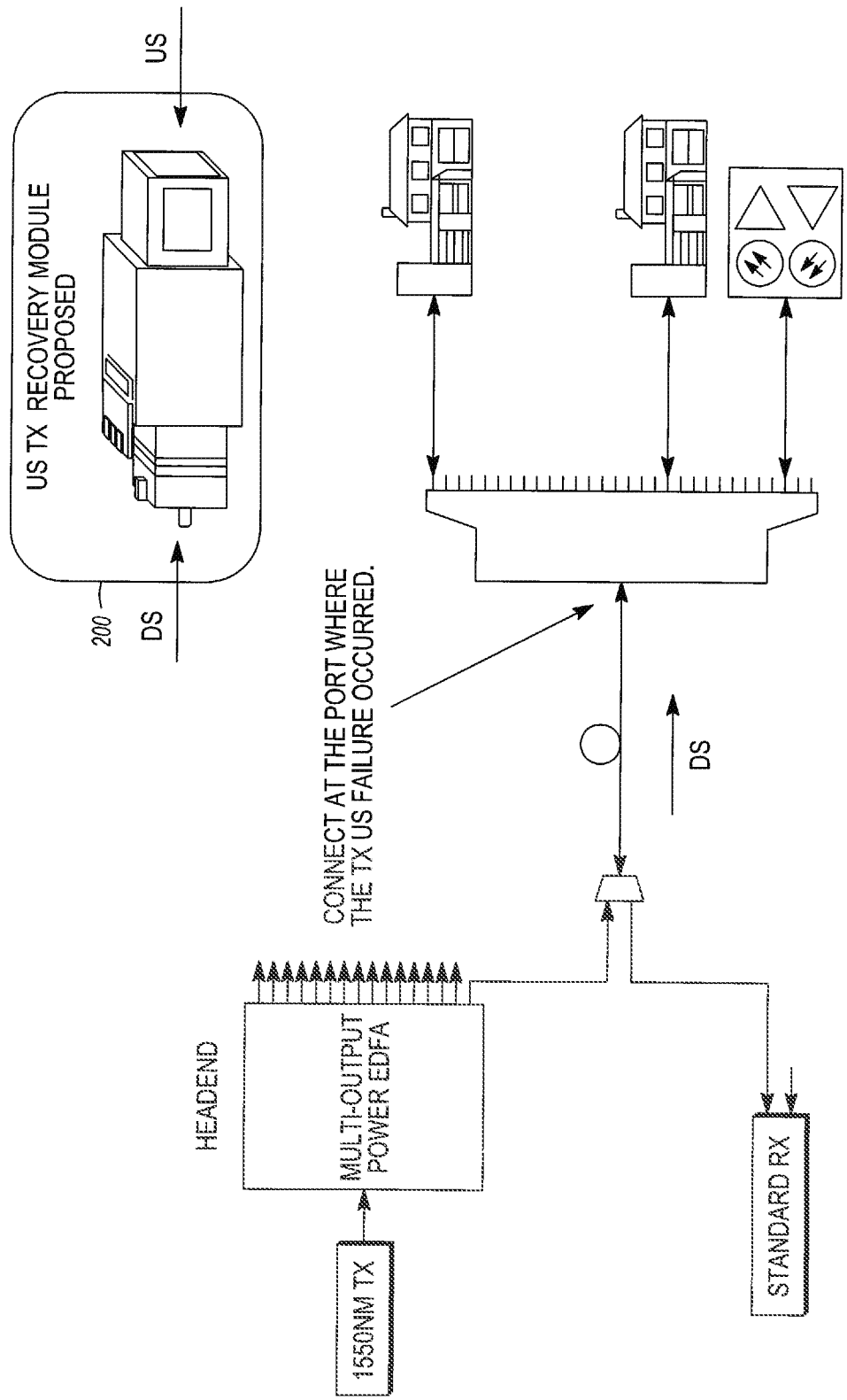
FIG. 14 shows a multiport HPON node including an optical recovery module for an upstream transmitter.

FIG. 6 shows an exemplary optical recovery module 200 for an upstream transmitter. Preferably, the recovery module 200 will be connected at the common port of the node only after a failure occurs. The exemplary recovery module 200 may include a housing supporting a first connection 212 selectively connectable to the common port of the node to which the node's laser transmitter normally outputs an upstream signal. The housing also supports a second connection 214 selectively connectable to the fiber-optic link that would typically connect to the common port of the node to which the node's laser transmitter normally outputs an upstream signal input terminal of the photodiode that has failed. Stated simply, and as graphically illustrated in FIG. 14, the recovery module 200 is simply an adapter that at one end plugs into common upstream port of the node, which during normal operation propagates the upstream optical signal from the node's laser, and where the cable link that was connected to that common port connects to the other end of the recovery module 200.

The recovery module 200 also defines an optical path 216 from the first connection 212 to the second connection 214, and through a wavelength selective filter 218 tuned to pass through signals in the spectrum reserved for downstream transmissions (typically 1550 nm), but to divert signals in the spectrum reserved for upstream transmissions (typically 1610 nm) from a laser 220 to the port 214. The laser 220 has an electrical connection 222 selectively connectable to the main Printed Circuit Board Assembly (PCBA) of the node, which hosts the RF signal conditioning circuits of the radio-frequency (RF) upstream signals received inside the node. Thus, as can easily be seen, once plugged into the port of a failed laser transmitter and the PCBA of the node, the downstream signal will simply pass through the node unimpeded while the upstream signal, after being converted to an electrical signal by the node's PCBA, will be used to drive the laser 220, the output of which is redirected by the filter 218 to the upstream port 214, just as if it were transmitted from the failed laser.

Figure 7:
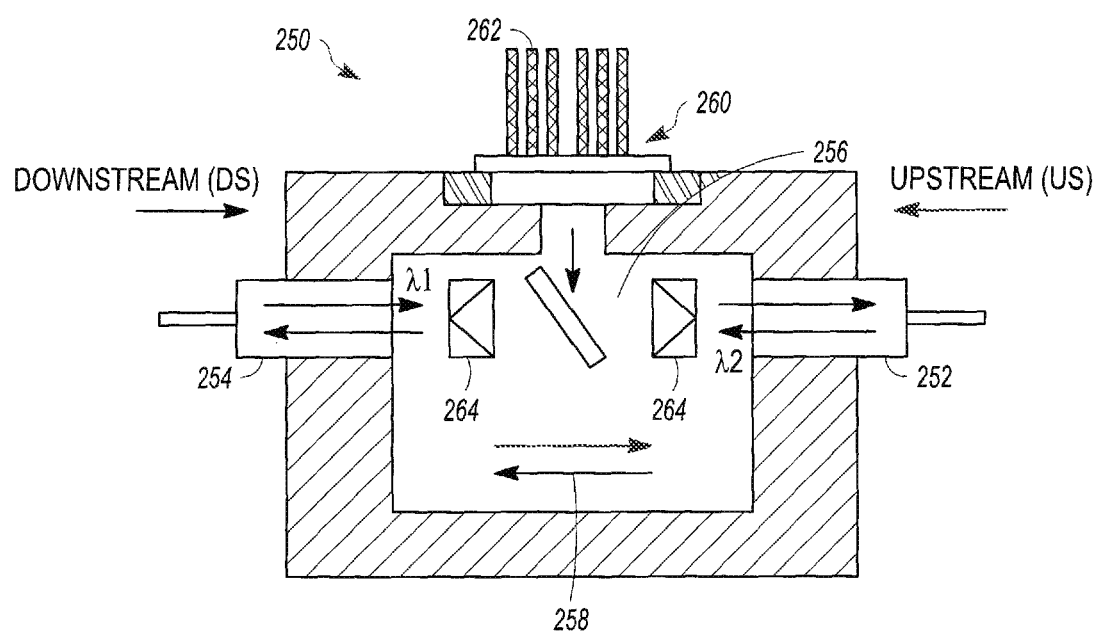
FIG. 7 shows an alternate exemplary optical recovery module for a transmitter that transmits an upstream optical signal.

FIG. 7 shows an alternate recovery module 250 intended to be integrated into a node for redundancy functionality for a failed upstream transmitter. Preferably, the recovery module 250 is connected to the node even when the laser inside the node is operating correctly. The recovery module 250 preferably includes a housing supporting a first connection 252 selectively connectable to the common port of the node to which the node's laser transmitter normally outputs an upstream signal. The housing also supports a second connection 254 selectively connectable to the fiber-optic link that would typically connect to the common port of the node to which the node's laser transmitter normally outputs an upstream signal input terminal of the photodiode that has failed. The recovery module 250 also defines a first optical path 256 from the first connection 252 to the second connection 254, and through a wavelength selective filter 258 tuned to pass through signals in the spectrum reserved for downstream transmissions (typically 1550 nm), but to divert signals in the spectrum reserved for upstream transmissions (typically 1610 nm) from a laser 260 to the port 214. The laser 260 has an electrical connection 262 selectively connectable to the main Printed Circuit Board Assembly (PCBA) of the node, which hosts the RF signal conditioning circuits of the radio-frequency (RF) upstream signals received inside the node.

The recovery module 250 also includes a second optical path 257 from the first connection 252 to the second connection 264. The recovery module 250 includes switches 264 that may be selectively activated when the node's laser fails. Thus, during normal operation when the node's laser is operational, the switches 264 direct the upstream and downstream signals through the second path 257. Should the node's laser fail, however, the switches may redirect the upstream and downstream signals through the first path 256, in which case the recovery module 350 behaves exactly as does the recovery module 200. In some embodiments, the switches 264 may be activated remotely, while in other embodiments, the switches 264 may be activated on-site.

Figure 8B:
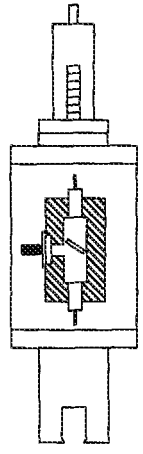
FIG. 8B shows several alternatives to the mechanical design of FIG. 8A.
Figure 8B:
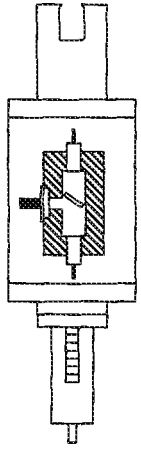
Figure 8B:
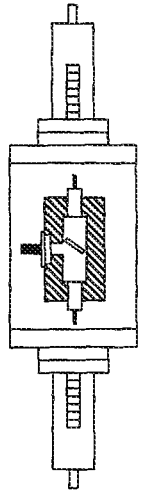
Figure 8B:
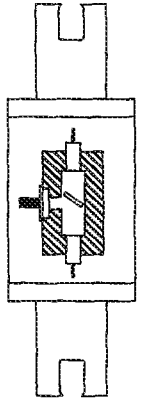
Figure 8B:
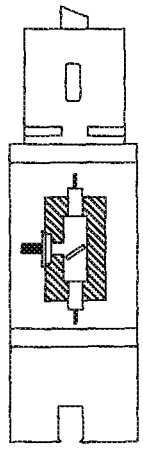
Figure 8B:
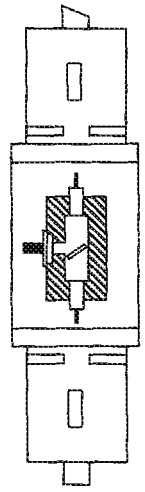
Figure 8B:
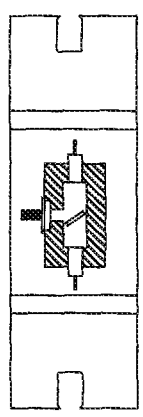

FIG. 8A shows an exemplary mechanical design for the optical recovery modules depicted in FIGS. 4-7. Specifically, a housing 300 may define an enclosure 305 enclosing the respective optical and electrical components described with an applicable one of the embodiments described with respect to FIGS. 4-7. The housing 300 also supports a male optical connector 310 on one end and a female optical connector 320 on the other end. Those of ordinary skill in the art will appreciate that any one of a number of types of connectors (e.g. SC, LC, or others) may be selected for the connectors 310 and 320, and will also appreciate that in some embodiments, the male/female connections may be on the reverse side from what FIG. 8A shows. For example, FIG. 8B shows seven exemplary configurations, which should be understood as merely illustrative of the wide range of possible configurations depending the specific requirements of the RFoG/FTTH node as depicted in FIG. 8A.

Figure 9B:
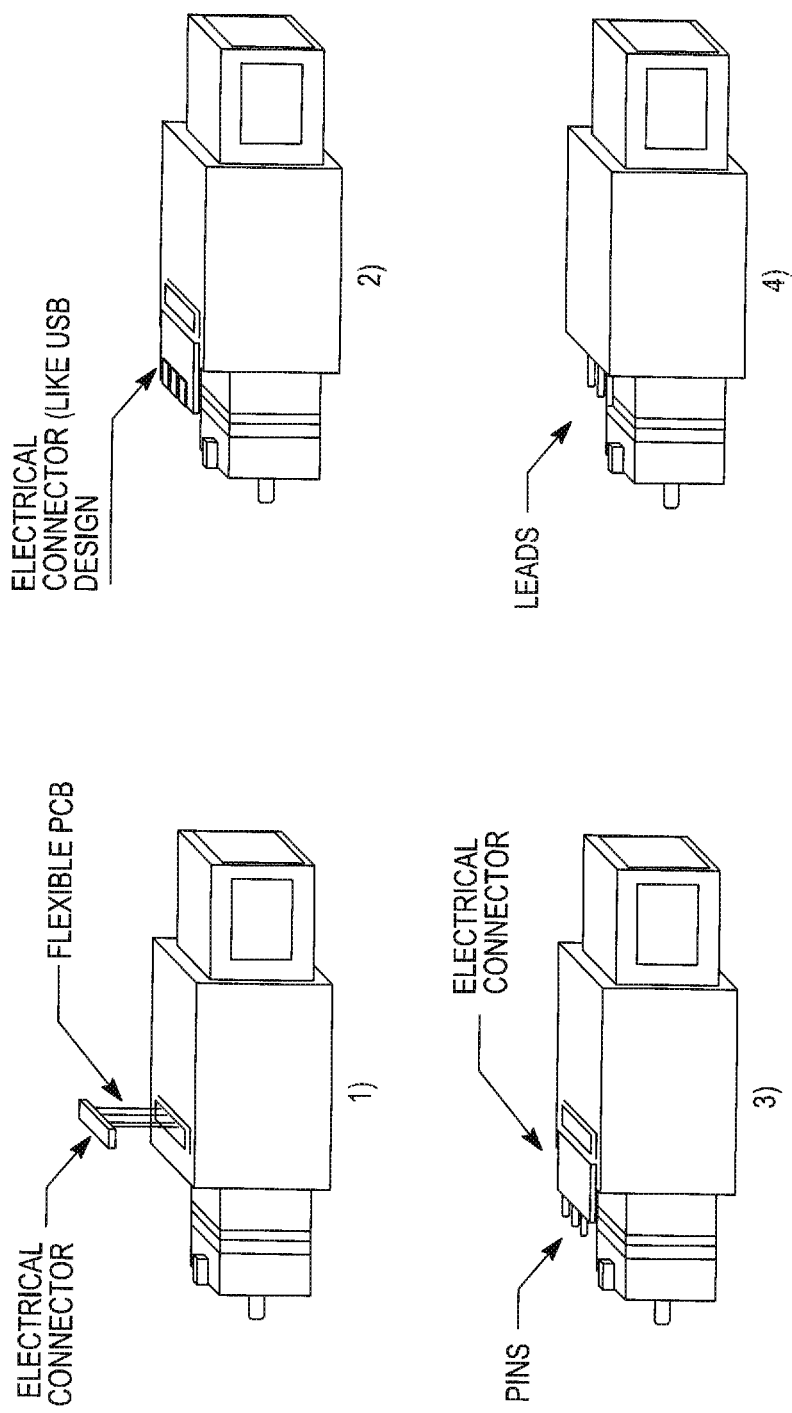
FIG. 9B shows several alternatives to the electrical interface of FIG. 9A.

Referring to FIG. 9, in one embodiment, the electrical interface 330 of the proposed optical recovery module preferably connects the photodiode or the upstream transmitter laser electrical input/outputs of the RFoG/FTTH node towards the Printed Circuit Board Assembly (PCBA), which hosts the RF signal conditioning circuits of the RF upstream signals received inside the node. As depicted in FIG. 9A, several types of connections are presented such as, but not limited to: flexible Printed Circuit Board (PCB), cable, connector (like Universal Serial Bus USB), or pin/leads. Those of ordinary skill in the art will appreciate that the electrical distance from the electrical connection of the proposed optical module to the main PCBA inside the node should be minimized so as to avoid signal imperfections and reduce complexity of the RF matching and tuning circuit, e.g. S-Parameters: flatness, return loss, etc.

Figure 10:
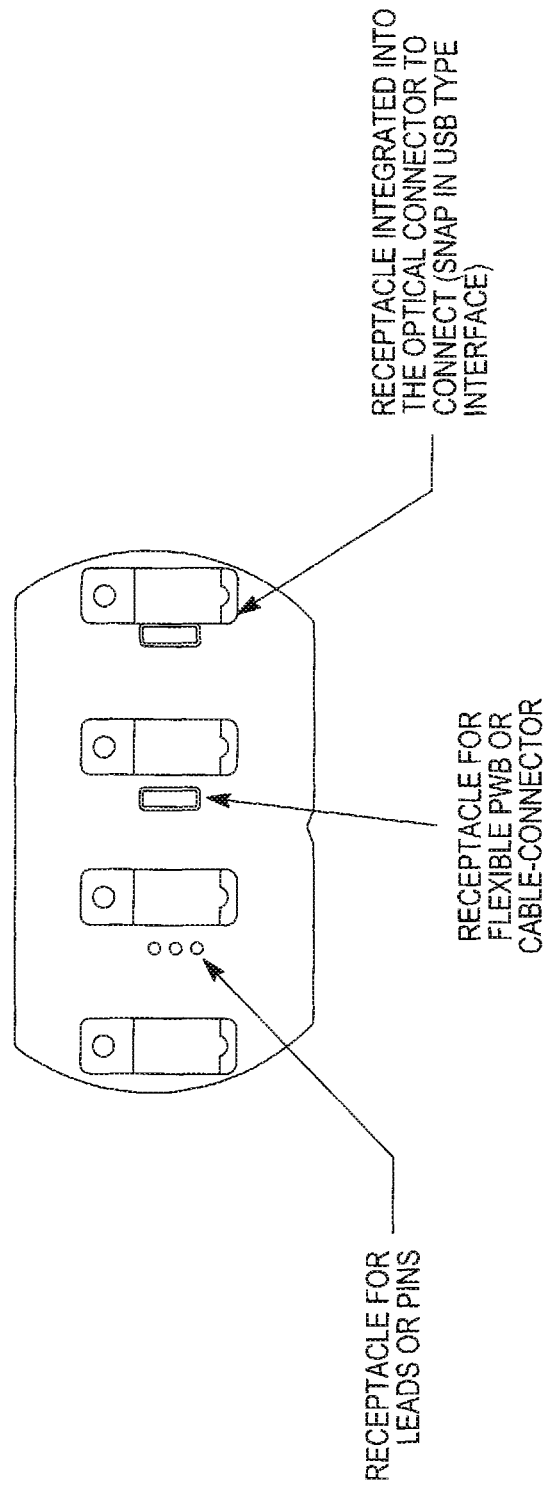
FIG. 10 shows several possible electrical receptacles to which the optical recovery module of FIG. 4 may be connected.
Figure 11:
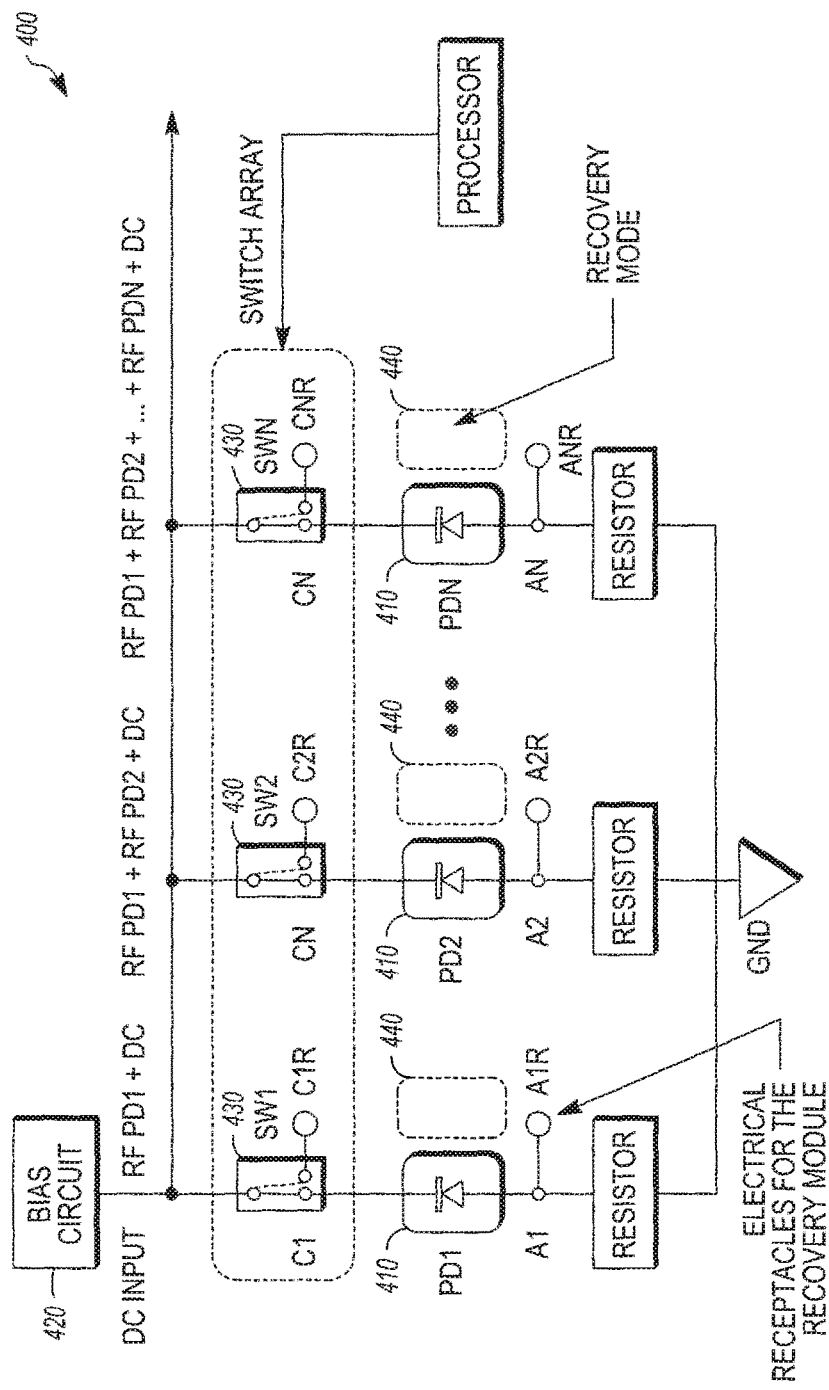
FIG. 11 shows an exemplary electrical diagram for an optical recovery unit where photodiodes are cascaded.

FIG. 10 shows several illustrative examples to complete an electrical connection from the proposed recovery module to the PCBA of the RFoG/FTTH node. Such interfaces include, but are not limited to, receptacles for pins or leads, receptacles for flexible PCB or cable-connectors, or a modified optical connector with snap-in interface for both, and optical connectors and electrical blades from the optical module (e.g. USB type). Internally, in the node, this receptacle should have a connection to the main PCBA to transport the RF and DC signals from/to the optical recovery module to/from the upstream RF conditioning circuit. The electrical bridge can be implemented using a conventional rigid PCB or a flexible PCB, FIG. 11 shows an electrical diagram of node 400 configured to use a backup recovery module where the node 400 uses cascaded photodiodes 410, rather than stacked photodiodes. In this case, all photodiodes 410 share the same bias circuit 420, where a respective electrical switch 430 is positioned in series with each active photodiode 410 in the node. In parallel to each photodiode are electrical receptacles 440 to receive the Anode/Cathode connection from another photodiode of a recovery module, such as one depicted in either of FIG. 4 or 6, i.e. the node 400 can be configured to support both backup and redundancy embodiments of the recovery module. In the backup embodiment, if a photodiode failure occurs, the optical recovery module, such as the one shown in FIG. 4, must be connected optically and electrically in-line on the specific port failing. The corresponding switch is configured via the node processor to operate the new photodiode of the installed optical recovery module. In the redundancy embodiment, the node processor should trigger the electrical switches on the PCBA and the optical switches in the recovery module to change operation to recovery mode. This can be achieved by monitoring the PD current, using predetermined threshold values to activate the recovery mode. Those of ordinary skill in the art will understand that the number of electrical switches implemented in the array of cascaded photodiodes is the number of photodiodes that can be covered by the recovery system. In other words, if only one electrical switch is implemented, then the system (the RFoG/FTTH node) can be recovered after a failure of a single photodiode. If another photodiode fails, there is no option to use the recovery module. Thus, the number of electrical switches implemented as part of the recovery circuit determines the recovery capabilities of the set of photodiodes into the RFoG/FTTH node.

Figure 12:
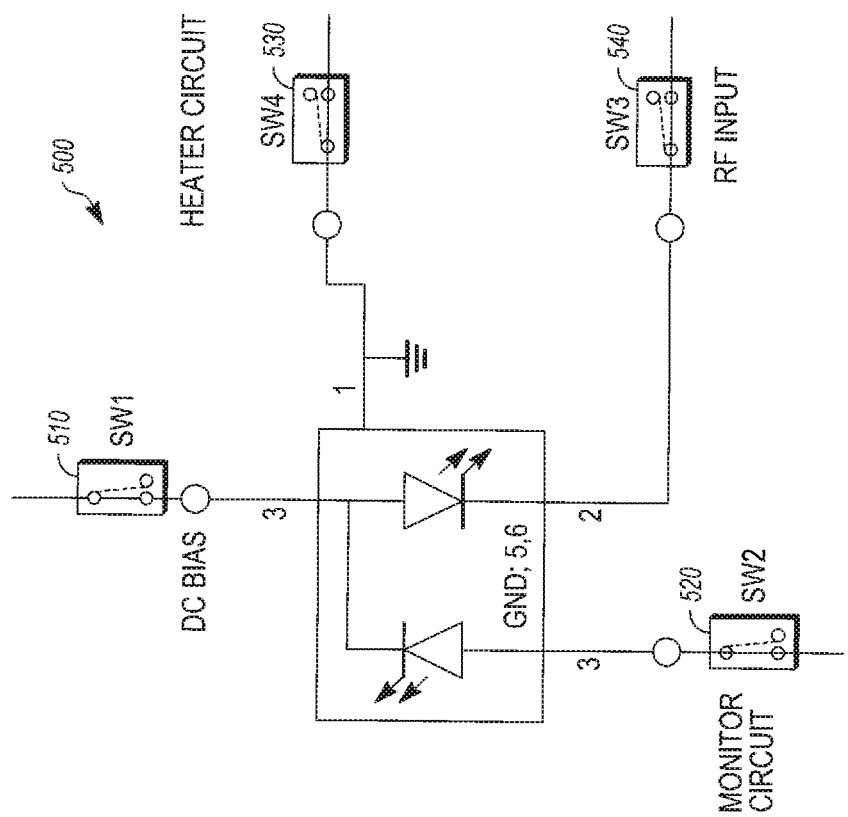
FIG. 12 shows an exemplary electrical diagram for a recovery circuit for an upstream transmitter.

FIG. 12 shows the electrical diagram of an exemplary laser circuit 500 of node that is configured to use a backup transmitter recovery module such as the ones depicted in FIGS. 5 and 7. Electrical switches are positioned on the laser circuit for bias current (switch 510), RF input, optical power monitor circuit (switch 520), the heater circuit (switch 530), and the RF input (switch 540). Each electrical switch alternatingly connects the node's laser or the backup laser to the respective circuit element, e.g. bias circuit, RF feed, etc. Again, the circuit 500 supports either a backup or redundancy configuration. In an embodiment using a backup recovery module, if an upstream transmitter failure occurs, the proposed optical recovery module must be connected optically and electrically in-line to the common port of the RFoG/FTTH node. The corresponding electrical switches are configured via the node processor to operate the new upstream transmitter of the installed optical recovery module. In an embodiment using a redundancy recovery module, the node processor preferably automatically triggers the electrical switches on the PCB and the optical switches in the recovery module to change from operating to recovery mode. The method that can be used is by monitoring the current of the integrated photodiodes in the transmitter laser. Then, threshold values are pre-established to activate the recovery mode.

Figure 15:
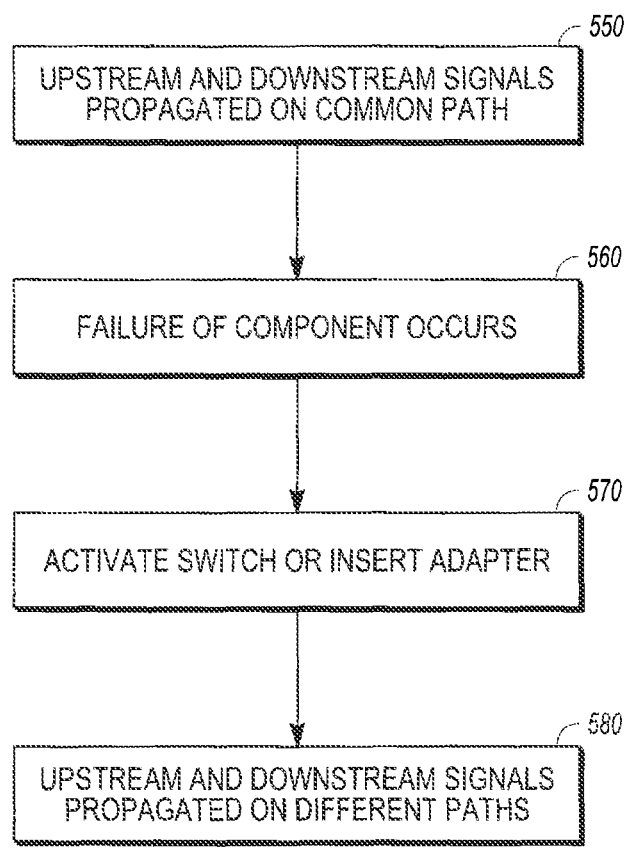
FIG. 15 shows an exemplary flowchart for bypassing a defective component using any of the optical recovery modules of FIG. 4-7.

FIG. 15 generally shows a sequence of events that may occur, using any of the exemplary optical recovery modules shown in FIGS. 407, when a component such as a photodiode or a transmitter fails between a head end and one or more subscribers. Initially, at block 550, upstream and downstream signals are propagated along a common transmission path through, e.g. a node. At block 560, the failure of a component used to communicate signals in an upstream direction fails, such as a laser transmitter or a photodiode. At block 570, an adapter is placed in-line along the upstream path at the input to the failed component (e.g. FIGS. 4 and 6) or a switch is activated, either manually or automatically (e.g. FIGS. 5 and 7). At block 580, the upstream signal is propagated along a different path than is the downstream signal. In some embodiments, after a switch is activated or an adapter is inserted, both the upstream and downstream signals move to new paths, e.g. from a first path commonly shared by both upstream and downstream signals to a new set of paths where the upstream and downstream signals diverge. In other embodiments, after a switch is activated or an adapter is inserted, only the upstream signal moves to a new path, which diverges from the first path that was commonly shared with the downstream signal.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A device for relaying upstream signals from a plurality of CATV subscribers, the device selectively connectable to a combining network relaying respective upstream and downstream signals to and from said plurality of subscribers, the device comprising a wavelength-dependent filter that transmits the downstream signal and redirects the upstream signal, the device including at least one switch for selectively and alternately connecting the device to, and disconnecting the device from, the combining network.

2. The device of claim 1 where the wavelength-dependent filter redirects the upstream signal to a photodiode.

3. The device of claim 1 where the wavelength-dependent filter redirects a signal from a laser.

4. The device of claim 1 configured as an adapter with a first connector selectively connectable to a receptacle of said combining network, the second connection selectively connectable to a cable carrying an optical signal from at least one of said subscribers.

5. The device of claim 1 where the at least one switch is operated automatically upon detection of a failed part in the combining network.

6. The device of claim 1 including an interface selectively connectable to a Printed Circuit Board Assembly of the combining network.

7. A device for relaying upstream signals from a plurality of CATV subscribers, the device selectively connectable to a combining network relaying respective upstream and downstream signals to and from said plurality of subscribers, the device comprising a wavelength-dependent filter that transmits the downstream signal and redirects the upstream signal, where at least one switch is operable automatically upon detection of a failed part in the combining network.

8. The device of claim 7 where the wavelength-dependent filter redirects the upstream signal to a photodiode.

9. The device of claim 7 where the wavelength-dependent filter redirects a signal from a laser.

10. The device of claim 7 configured as an adapter with a first connector selectively connectable to a receptacle of said combining network, the second connection selectively connectable to a cable carrying an optical signal from at least one of said subscribers.

11. The device of claim 7 including at least one switch for selectively and alternately connecting the device to, and disconnecting the device from, the combining network.

12. The device of claim 7 including an interface selectively connectable to a Printed Circuit Board Assembly of the combining network.

* * * * *